US008465871B2

(12) United States Patent
Juzkow et al.

(10) Patent No.: US 8,465,871 B2
(45) Date of Patent: Jun. 18, 2013

(54) ELECTROCHEMICAL CELLS WITH TABS

(75) Inventors: Marc Juzkow, Livermore, CA (US);
Aakar Patel, Pleasanton, CA (US); Jun Lui, San Jose, CA (US); Konstantin Tikhonov, Newark, CA (US); Michael Erickson, Sunnyvale, CA (US); Hashmat Haidari, Fremont, CA (US); Thomas Nagy, San Jose, CA (US); Hongli Dai, Los Altos, CA (US)

(73) Assignee: Leyden Energy, Inc., Fremont, CA (US)

( * ) Notice: Subject to any disclaimer, the term of this patent is extended or adjusted under 35 U.S.C. 154(b) by 0 days.

(21) Appl. No.: 13/343,625

(22) Filed: Jan. 4, 2012
(Under 37 CFR 1.47)

(65) Prior Publication Data
US 2012/0141864 A1   Jun. 7, 2012

Related U.S. Application Data

(63) Continuation of application No. 12/623,365, filed on Nov. 20, 2009, which is a continuation of application No. PCT/US2009/036400, filed on Mar. 6, 2009.

(60) Provisional application No. 61/034,880, filed on Mar. 7, 2008.

(51) Int. Cl.
*H01M 10/40* (2006.01)
*H01M 4/66* (2006.01)
*H01M 4/48* (2010.01)
*H01M 10/04* (2006.01)

(52) U.S. Cl.
USPC ............... 429/211; 429/231.1; 429/231.8; 429/245; 429/324; 977/948

(58) Field of Classification Search
None
See application file for complete search history.

(56) References Cited

U.S. PATENT DOCUMENTS

| 5,238,757 | A | 8/1993 | Suzuki et al. |
| 5,476,734 | A * | 12/1995 | Pulley et al. ............. 429/244 |
| 6,699,623 | B1 * | 3/2004 | Dai ........................ 429/306 |
| 6,723,472 | B2 | 4/2004 | Nakanishi et al. |
| 6,893,772 | B2 * | 5/2005 | Howard .................... 429/94 |
| 7,083,878 | B2 | 8/2006 | Kotato et al. |
| 7,206,189 | B2 | 4/2007 | Reynolds, III |
| 7,261,972 | B2 | 8/2007 | Inada et al. |
| 2003/0112580 | A1 | 6/2003 | Reynolds, III et al. |
| 2004/0121237 | A1 | 6/2004 | Kelley et al. |
| 2006/0222957 | A1 * | 10/2006 | Hara et al. ............... 429/316 |
| 2006/0263686 | A1 * | 11/2006 | Zhao ....................... 429/211 |
| 2007/0076349 | A1 | 4/2007 | Dementiev et al. |
| 2007/0202405 | A1 | 8/2007 | Shizuka et al. |
| 2009/0117457 | A1 | 5/2009 | Davis et al. |

FOREIGN PATENT DOCUMENTS

| CN | 1729587 A | 2/2006 |
| CN | 1947288 A | 4/2007 |
| KR | 10-2002-0018184 A | 3/2002 |
| KR | 2003-0073168 A | 9/2003 |
| WO | 2004/062005 A2 | 7/2004 |

* cited by examiner

*Primary Examiner* — John S Maples
(74) *Attorney, Agent, or Firm* — Kilpatrick Townsend & Stockton LLP

(57) ABSTRACT

The present invention provides electrochemical cells and batteries having one or more electrically conductive tabs and carbon sheet current collectors, where the tabs are connected to the carbon sheet current collectors; and methods of connecting the tabs to the carbon based current collectors. In one embodiment, the electrically conductive tabs are metallic tabs.

29 Claims, 6 Drawing Sheets

ELECTROCHEMICAL CELLS WITH TABS

CROSS-REFERENCE TO RELATED APPLICATIONS

This application is a continuation of U.S. patent application Ser. No. 12/623,365, filed Nov. 20, 2009, which application is a continuation of PCT/US2009/036400, filed Mar. 6, 2009, and claims the benefit of U.S. Provisional Patent Application No. 61/034,880, filed Mar. 7, 2008.

BACKGROUND OF THE INVENTION

In recent years, the demand for high performance batteries has increased, driven in part by the increasingly large number of portable consumer electronics products and growing needs of batteries for fuel efficient vehicles. Lithium-ion batteries are found in many applications requiring high energy and high power densities, as they can provide high volumetric and gravimetric efficiency in battery packs for use in portable electronic devices and in fuel-saving vehicles.

Lithium-ion cells require tabs for making the connections between their internal active material and external power terminals. The tabs are typically attached directly to the current collectors. Coupling between the tabs and the electrodes can be difficult especially for cells having graphite sheet current collectors. One reason involves differences in the physical properties of the tabs and the current collectors. This dissimilarity in material properties can lead to high contact impedance, brittle joints or other unacceptable performance-related problems. To address such problems, current coupling methods have involved ultrasonic welding and resistance spot welding to achieve a secure joint between the tab and pin. Unfortunately, these methods are not suitable for attaching a metallic tab to a graphite based current collector.

Therefore, there is a need to develop other tabbing methods for attaching tabs to electrochemical cells, such as lithium-ion cells having carbon sheet current collectors. The present invention satisfies these and other needs.

BRIEF SUMMARY OF THE INVENTION

The present invention relates to electrochemical cells and batteries having one or more electrically conductive tabs and carbon sheet current collectors, where the tabs are connected to the carbon sheet current collectors; and methods of connecting the tabs to the carbon based current collectors. Compared to the existing cells and methods, the present invention offers electrochemical cells with stable metallic tab to carbon sheet connections and low contact impedance.

In one aspect, the present invention provides an electrochemical cell. The electrochemical cell includes a positive electrode comprising a positive electrode material and a positive electrode current collector, wherein the positive electrode material is in electronically conductive contact with the positive electrode current collector; a negative electrode comprising a negative electrode material and a negative electrode current collector, wherein the negative electrode material is in electronically conductive contact with the negative electrode current collector; an ion conductive medium comprising an ion conductive layer and an electrolyte solution in ionically conductive contact with the positive electrode and the negative electrode; at least one positive electrode tab having a first attachment end and a second attachment end, wherein the first attachment end is connected to the positive electrode current collector; optionally, at least one negative electrode tab having a first attachment end and a second attachment end, wherein the first attachment end is connected to the negative electrode current collector; wherein the positive electrode current collector is a conductive carbon sheet selected from the group consisting of a graphite sheet, a carbon fiber sheet, a carbon foam, a carbon nanotube film and a mixture thereof, each of which has an in-plane electronic conductivity of at least 1000 S/cm, and wherein the tabs are made from an electrically conductive material, such as a metal, a metal alloy or a composite material. In one embodiment, the metal is selected from the group consisting of copper, nickel, chromium, aluminum, titanium, stainless steel, gold, tantalum, niobium, hafnium, zirconium, vanadium, indium, cobalt, tungsten, beryllium and molybdenum and alloys thereof or an alloy thereof. In certain instances, the tab has protective coatings against corrosion. The coatings can be any of the above metals, anodizing and oxide coatings, conductive carbon, epoxy and glues, paints and other protective coatings. In other instances, the coatings can be nickel, silver, gold, palladium, platinum, rhodium or combinations thereof for improving conductivity of the tabs. The alloys can be a combinations of metals described herein or formed by combining the metals described above with other suitable metals known to persons of skill in the art.

In another aspect, the present invention provides a battery. The battery includes a housing, a positive connector, a negative connector, a electrochemical cell disposed in the housing, where the positive and the negative connector are mounted on the housing. In one embodiment, the housing is a sealed container.

In yet another aspect, the present invention provides a method of connecting a tab to an electrode in an electrochemical cell. The method includes (a) providing an electrode comprising an electrode active material and a carbon current collector, wherein the electrode active material is in electronically conductive contact with the carbon current collector; (b) providing a tab having a first attachment end for attaching to the electrode; and (c) connecting the first attachment end of the tab to the carbon current collector through a process selected from the group consisting of riveting, conductive adhesive lamination, hot press, ultrasonic press, mechanical press, crimping, pinching, staking and a combination thereof. In certain instances, the tabs are deposited with sealing/protective cover layers on one side or both sides of the tabs.

DETAILED DESCRIPTION OF THE INVENTION

Figure 1:
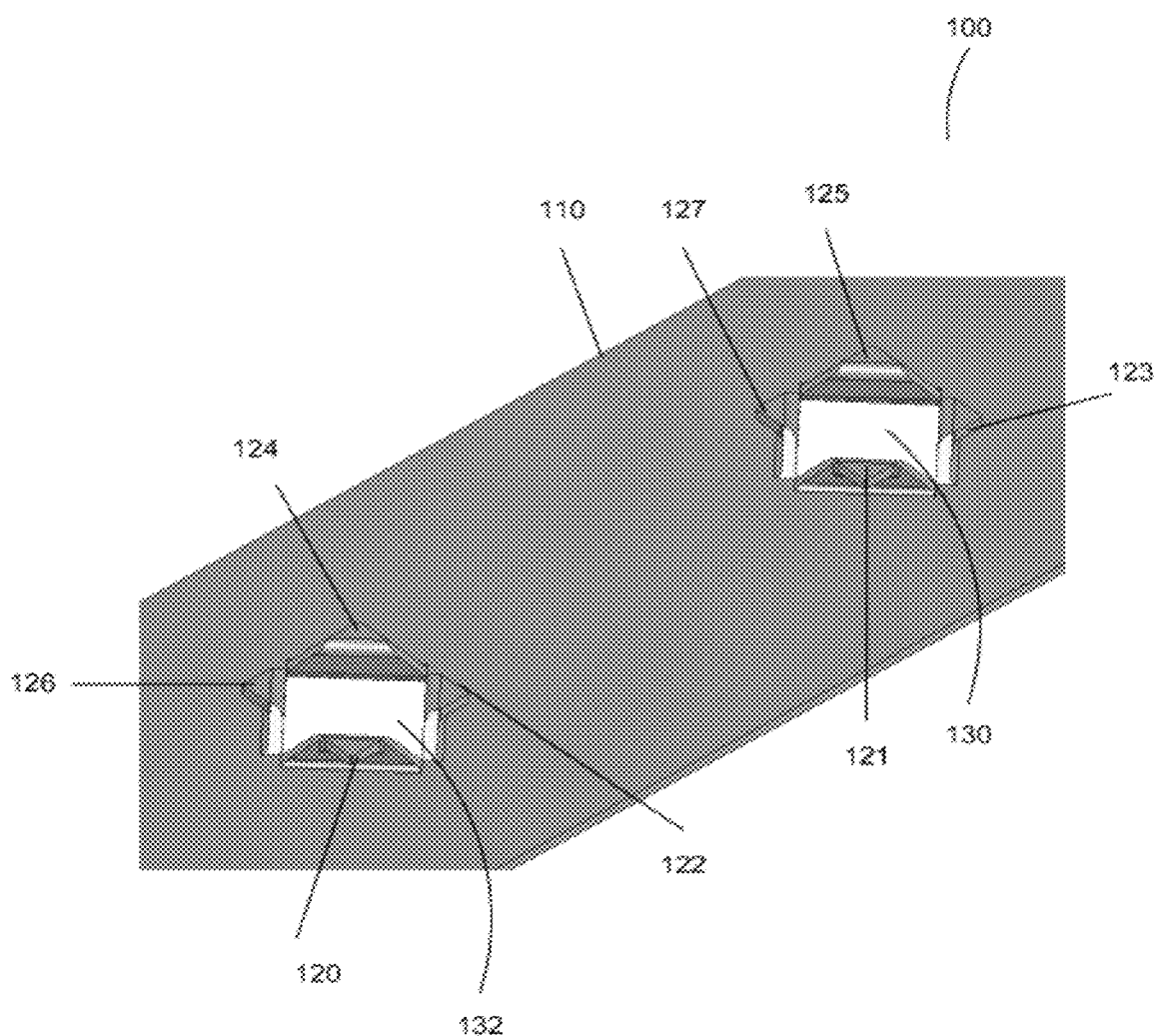
FIG. 1 illustrates a tab having openings formed by using a piercing hand or mechanized tool, where each opening is surrounded by four sharp edges protruding above the surface of the tab.

The term "alkyl", by itself or as part of another substituent, includes, unless otherwise stated, a straight or branched chain hydrocarbon radical, having the number of carbon atoms designated (i.e. $C_{1-8}$ means one to eight carbons). Examples of alkyl groups include methyl, ethyl, n-propyl, isopropyl, n-butyl, t-butyl, isobutyl, sec-butyl, n-pentyl, n-hexyl, n-heptyl, n-octyl, and the like.

The term "alkylene" by itself or as part of another substituent includes a linear or branched saturated divalent hydrocarbon radical derived from an alkane having the number of carbon atoms indicated in the prefix. For example, $(C_1-C_6)$ alkylene is meant to include methylene, ethylene, propylene, 2-methylpropylene, pentylene, and the like.
Perfluoroalkylene means to an alkylene where all the hydrogen atoms are substituted by fluorine atoms. Fluoroalkylene means to an alkylene where hydrogen atoms are partially substituted by fluorine atoms.

The terms "halo" or "halogen," by themselves or as part of another substituent, mean, unless otherwise stated, a fluorine, chlorine, bromine, or iodine atom.

The term "haloalkyl," are meant to include monohaloalkyl and polyhaloalkyl. For example, the term "$C_{1-4}$haloalkyl" is mean to include trifluoromethyl, 2,2,2-trifluoroethyl, 4-chlorobutyl, 3-bromopropyl, 3-chloro-4-fluorobutyl and the like.

The term "perfluoroalkyl" includes an alkyl where all the hydrogen atoms in the alkyl are substituted by fluorine atoms. Examples of perfluoroalkyl include —$CF_3$, —$CF_2CF_3$, —$CF_2$-$CF_2CF_3$, —$CF(CF_3)_2$, —$CF_2CF_2CF_2CF_3$, —$CF_2CF_2CF_2CF_2CF_3$ and the like.

The term "aryl" includes a monovalent monocyclic, bicyclic or polycyclic aromatic hydrocarbon radical of 5 to 10 ring atoms, which can be a single ring or multiple rings (up to three rings), which are fused together or linked covalently. More specifically the term aryl includes, but is not limited to, phenyl, biphenyl, 1-naphthyl, and 2-naphthyl, and the substituted forms thereof.

The term "positive electrode" refers to one of a pair of rechargeable lithium-ion cell electrodes that under normal circumstances and when the cell is fully charged will have the highest potential. This terminology is retained to refer to the same physical electrode under all cell operating conditions even if such electrode temporarily (e.g., due to cell overdischarge) is driven to or exhibits a potential below that of the other (the negative) electrode.

The term "negative electrode" refers to one of a pair of rechargeable lithium-ion cell electrodes that under normal circumstances and when the cell is fully charged will have the lowest potential. This terminology is retained to refer to the same physical electrode under all cell operating conditions even if such electrode is temporarily (e.g., due to cell overdischarge) driven to or exhibits a potential above that of the other (the positive) electrode.

In one aspect, the present invention provides an electrochemical cell. The cell is composed of a positive electrode, a negative electrode, an ion conductive medium in ionically conductive contact with the positive electrode and the negative electrode and at least one positive electrode tab having a first attachment end and a second attachment end, where the first attachment end is connected to the positive electrode. The positive electrode includes a positive electrode material and a positive electrode current collector, which is in electronically conductive contact with the positive electrode material and the first attachment end of the positive electrode tab. The first attachment end can connect to the positive electrode current collector or the positive electrode active material. Optionally, the electrochemical cell includes at least one negative electrode tab having a first attachment end and a second attachment end, where the first attachment end is connected to the negative electrode. The first attachment end of the negative electrode tab can connect to the negative electrode current collector or the negative electrode active material. In one embodiment, the positive electrode current collector is a conductive carbon sheet selected from the group consisting of a graphite sheet, a carbon fiber sheet, a carbon foam, a carbon nanotube film and a mixture thereof, each of which has an in-plane electronic conductivity of at least 1000 S/cm, preferably 2000 S/cm, and most preferably 3000 S/cm. In another embodiment, the negative electrode current collector is conductive carbon sheet selected from the group consisting of a graphite sheet, a carbon fiber sheet, a carbon foam, a carbon nanotube film and a mixture thereof The tabs are preferably made from an electrically conductive material, such as a metal. The tabs can have an anticorrosive layer and/or conductive coating. The contact resistance of the interface between the positive electrode and the metal tabs is less than 100 mOhm-$cm^2$, preferably less than 25, more preferably less than 20 mOhm-$cm^2$, even more preferably less than 10 mOhm-$cm^2$, and still more preferably less than 2.5 mOhm-$cm^2$.

In some embodiments, the current collector for the electrode is a non-metal conductive substrate. Exemplary non-metal current collectors include, but are not limited to, a carbon sheet such as a graphite sheet, a carbon fiber sheet, a carbon foam, a carbon nanotube film, and a mixture of the foregoing or other conducting polymeric materials. Those of skill in the art will know of these conducting polymeric materials.

In one embodiment, the electrochemical cell has one or more tabs attached to each electrode. In one instance, each electrode has at least one tab. In another instance, each electrode has multiple tabs. In yet another instance, the positive electrode has multiple metal tabs attached to the positive electrode on the carbon current collector. For example, each electrode can have from 2 to 20 tabs. The positive and the negative electrode can have different numbers of tabs. The tabs can be made of a single metal, a metal alloy or a composite material. Preferably, the tabs are metallic. Suitable metals include, but are not limited to, iron, stainless steel, copper, nickel, chromium, zinc, aluminum, tin, gold, tantalum, niobium, hafnium, zirconium, vanadium, indium, cobalt, tungsten, beryllium and molybdenum and alloys thereof or an alloy thereof Preferably, the metal is anticorrosive. The tabs can have anticorrosive coatings made of any of the above metals, anodizing and oxide coatings, conductive carbon, epoxy and glues, paints and other protective coatings. The coatings can be nickel, silver, gold, palladium, platinum, rhodium or combinations thereof for improving conductivity of the tabs. In one instance, the tabs are made of copper, aluminum, tin or alloys thereof. The tabs can have various shapes and sizes. In general, the tabs are smaller than the current collector to which the tabs are attached to. In one embodiment, the tabs can have a regular or an irregular shape and form. In one instance, the tabs have L-shape, I-shape, U-shape, V-shape, inverted T-shape, rectangular-shape or combinations of shapes. Preferably, the tabs are metal strips fabricated into a particular shape or form. The alloys can be a combinations of metals described herein or formed by combining the metals described above with other suitable metals known to persons of skill in the art.

Typically, each of the tabs has a first attachment end and a second attachment end. The first attachment end is an internal end for attaching to a current collector and the second attachment end is an external or an open end for connecting to an external circuit. The first attachment end can have various shapes and dimensions. In one embodiment, the first attachment end of the tabs has a shape selected from the group consisting of a circle, an oval, a triangle, a square, a diamond, a rectangle, a trapezoidal, a U-shape, a V-shape, an L-shape, a rectangular-shape and an irregular shape. In one instance, the tabs are strips with the first attachment end having a dimension of at least 500 micrometers in width and 3 mm in length. In one embodiment, the attachment end has a dimension of at least 0.25 mm$^2$. In certain instances, the dimension is from about 1 mm$^2$ to about 500 mm$^2$. The second attachment end can connect either directly to an external circuit or through a conductive member. The conductive member can be a metal tab, rod or wire. The suitable metal can be copper, aluminum, iron, stainless steel, nickel, zinc, chromium, tin, gold, tantalum, niobium, hafnium, zirconium, vanadium, indium, cobalt, tungsten, beryllium and molybdenum and alloys thereof or an alloy thereof.

In one embodiment, the tabs are in direct contact with the current collector. In another embodiment, the tabs are in contact with the current collector through a conductive layer. The conductive layer can be attached to the surface of the tab, for example, by depositing a layer of carbon black on the tab. The conductive layer can include a conductive filler and a binder. In one instance, the conductive filler is selected from the group consisting of carbon black, conducting polymers, carbon nanotubes and carbon composite materials.

Suitable binders include, but are not limited to, a polymer, a copolymer or a combination thereof. Exemplary binders include, but are not limited to, polymeric binders, particularly gelled polymer electrolytes comprising polyacrylonitrile, poly(methylmethacrylate), poly(vinyl chloride), and polyvinylidene fluoride and copolymers thereof. Also, included are solid polymer electrolytes such as polyether-salt based electrolytes including poly(ethylene oxide)(PEO) and its derivatives, polypropylene oxide) (PPO) and its derivatives, and poly(organophosphazenes) with ethyleneoxy or other side groups. Other suitable binders include fluorinated ionomers comprising partially or fully fluorinated polymer backbones, and having pendant groups comprising fluorinated sulfonate, imide, or methide lithium salts. Preferred binders include polyvinylidene fluoride and copolymers thereof with hexafluoropropylene, tetrafluoroethylene, fluorovinyl ethers, such as perfluoromethyl, perfluoroethyl, or perfluoropropyl vinyl ethers; and ionomers comprising monomer units of polyvinylidene fluoride and monomer units comprising pendant groups comprising fluorinated carboxylate, sulfonate, imide, or methide lithium salts.

The tabs can be attached to the positive electrode or the negative electrode using a process selected from the group consisting of riveting, conductive adhesive lamination, hot press, ultrasonic press, mechanical press, staking, crimping, pinching, and a combination thereof. The process offers the advantages of providing strong binding to the current collector and yet maintaining high electrical conductivity and low impedance across the junction of tab and the current collector. The process is particularly suitable for attaching metal tabs to carbon sheet.

In one embodiment, the first attachment end includes an array of preformed micro indentations. The tabs can have an indentation density from about 1 to about 100 per square millimeter. The indentations can be produced by either a micro indentation hand tool or an automatic indentation device. In one instance, each indentation is about 1-100 μm in depth, such as 1, 2, 3, 4, 5, 6, 7, 8, 9, 10, 20, 30, 40, 50, 60, 70, 80, 90 or 100 micrometers and about 1-500 μm in dimension, such as 1, 10, 20, 30, 40, 50, 60, 70, 80, 90, 100, 120, 140, 160, 180, 200, 250, 300, 400, 450, 500 micrometers. The micro indentations can be either evenly or randomly spaced.

The tabs having an array of micro indentations are attached to the current collector via mechanical pressing or riveting to provide a close contact between the tabs and the current collector. Alternatively, the tabs are joint to the current collector through a conductive adhesive layer or staking.

In another embodiment, the first attachment end of the tabs includes an array of preformed micro openings having a plurality of protrusions, such as protruding edges. In one instance, the protrusions are sharp edges. The protrusions can be either generated during the process of making micro openings or prepared by a separate fabrication process. The protrusions extend from about 0.01 mm to about 10 mm above the surface of the tabs and can have various shapes. For example, the protrusions can be triangular, rectangular or circular. The micro openings can have a dimension from micrometers to millimeters. In certain instances, the protrusions extend between about 0.01 mm to 0.04 mm, such as about 0.01, 0.02, 0.03, or 0.04 mm above the surface of the tabs. Preferably, the openings have a dimension of about 1-1000 μm. In one embodiment, the micro openings are evenly spaced.

In another embodiment, the openings are randomly distributed. The micro openings can have various shapes. In one embodiment, the micro openings have a shape selected from the group consisting of a circle, an oval, a triangle, a square, a diamond, a rectangle, a trapezoidal, a rhombus, a polygon and an irregular shape.

The tabs having an array of micro openings with protrusions are welded to the current collector through a conductive adhesive layer or by staking, mechanical pressing, staking, riveting or a combination of processes and techniques. The electrically conductive adhesives are generally known to persons of skill in the art. For example, certain conductive adhesives are commercially available from 3M corporation, Aptek laboratories, Inc. and Dow Corning. Exemplary electrically conductive adhesive include, but are not limited to, urethane adhesive, silicone adhesive and epoxy adhesive.

The tabs applicable for the positive electrode as described above can also be used for the negative electrode. In one embodiment, the negative electrode has a carbon current collector.

In one embodiment, the pores in the carbon current collector can be sealed with resins, for example, by treating, contacting of the carbon current collector with resins. The resins can be conductive resins or non-conductive resins known to a person of skill in the art. Exemplary conductive resins are described in U.S. Pat. Nos. 7,396,492, 7,338,623, 7,220,795, 6,919,394, 6,894,100, 6,855,407, 5,371,134, 5,093,037, 4,830,779, 4,772,422, 6,565,772 and 6,284,817. Exemplary non-conductive resins, for example, in adhering, sealing and coating include, but are not limited to, epoxy resin, polyimide resin and other polymer resins known to persons skill in the art.

In one embodiment, FIG. 1 shows a metallic tab 110 having two diamond-shape openings 130 and 132. Openings can have various other shapes including, but not limiting to, a circle, an oval, a triangle, a square, a diamond, a rectangle, a trapezoidal, a U-shape, a V-shape, an L-shape, a rectangular-shape and an irregular shape. Exemplary metals for tab include, but are not limited to, copper, aluminum, iron, stainless steel, nickel, chromium, zinc, aluminum, tin, gold, tantalum, niobium, hafnium, zirconium, vanadium, indium, cobalt, tungsten, beryllium and molybdenum and alloys thereof or an alloy thereof. The tab can have a protective layer such as an anticorrosive coating or a conductive layer. The materials for the anticorrosive layer can be any of the metals above, anodizing and oxide coatings, conductive carbon, epoxy and glues, paints and other protective coatings. The conductive layer can include metals selected from nickel, silver, gold, palladium, platinum, rhodium or alloys thereof. Opening 130 has four sharp triangular edges 121, 123, 125 and 127. Opening 132 has four sharp triangular edges 120, 122, 124 and 126. The triangular edges are protruding above the surface of tab 110. The diamond-shape openings can be generated by piercing using a diamond shaped tool. Those of skill in the art will recognize that other piercing tools can also be used to produce openings with a various shapes and numbers of protruding edges.

Figure 2:
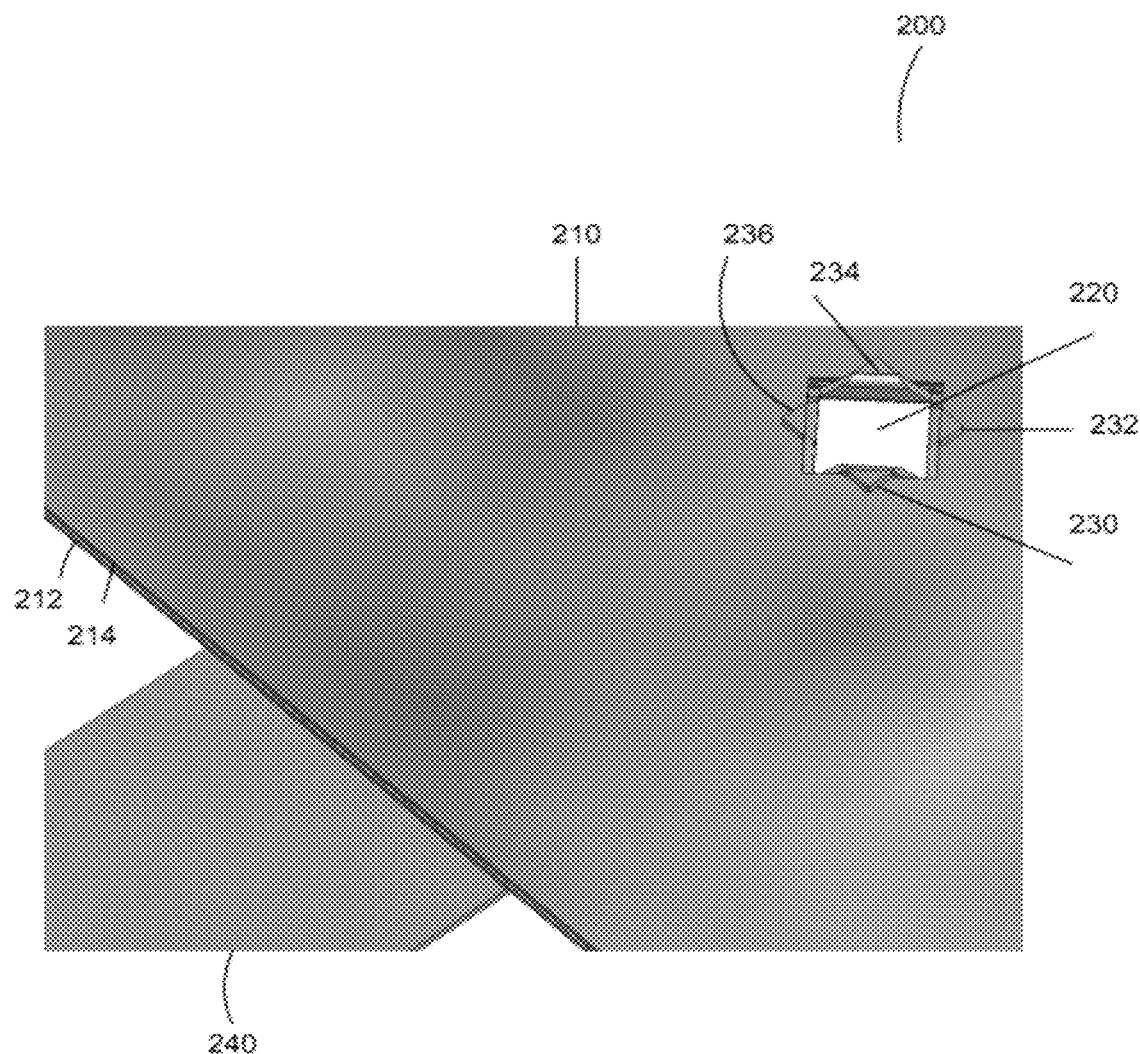
FIG. 2 illustrates a tab attached to a positive electrode carbon current collector through staking, where the tab has one opening.

FIG. 2 shows another embodiment of the invention. Electrode 210 includes current collector layer 212 and electrode active material layer 214. The electrode can be either a positive or a negative electrode. Metal tab 240 has an opening 220 with four sharp protruding edges 230, 232, 234 and 236. Tab 240 is firmly pressed against the electrode 210 on the side of current collector 212 resulting in the piercing of electrode 210. Alternatively, tab 240 can also be attached to the side of electrode active material layer 214. The protrusions have effectively staked the positive electrode to the current collecting tab.

Figure 3:
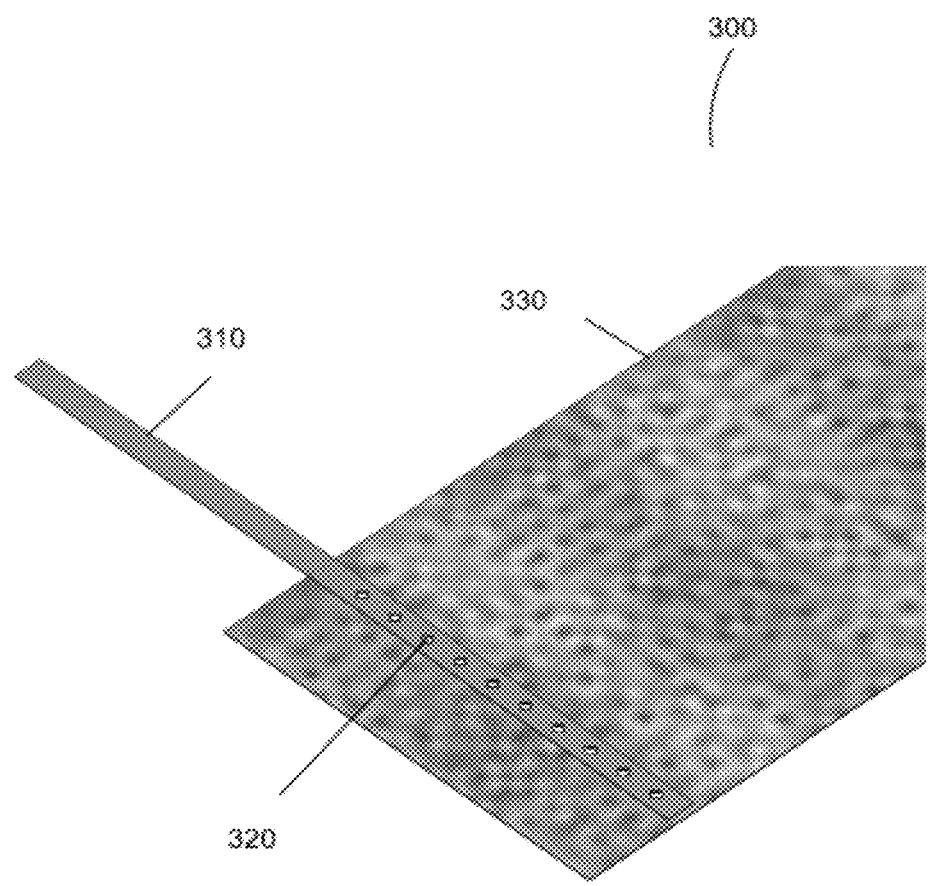
FIG. 3 illustrates a tab attached to a positive electrode carbon current collector through staking, where the tab has a plurality of openings.

FIG. 3 shows another embodiment of the invention. Tab 310 having multiple pierced openings as represented by 320 are staked onto positive electrode 330. The multiple openings have provided a strong and durable physical contact between tab 310 and electrode 330 to ensure the minimal electronic impedance.

Figure 4:
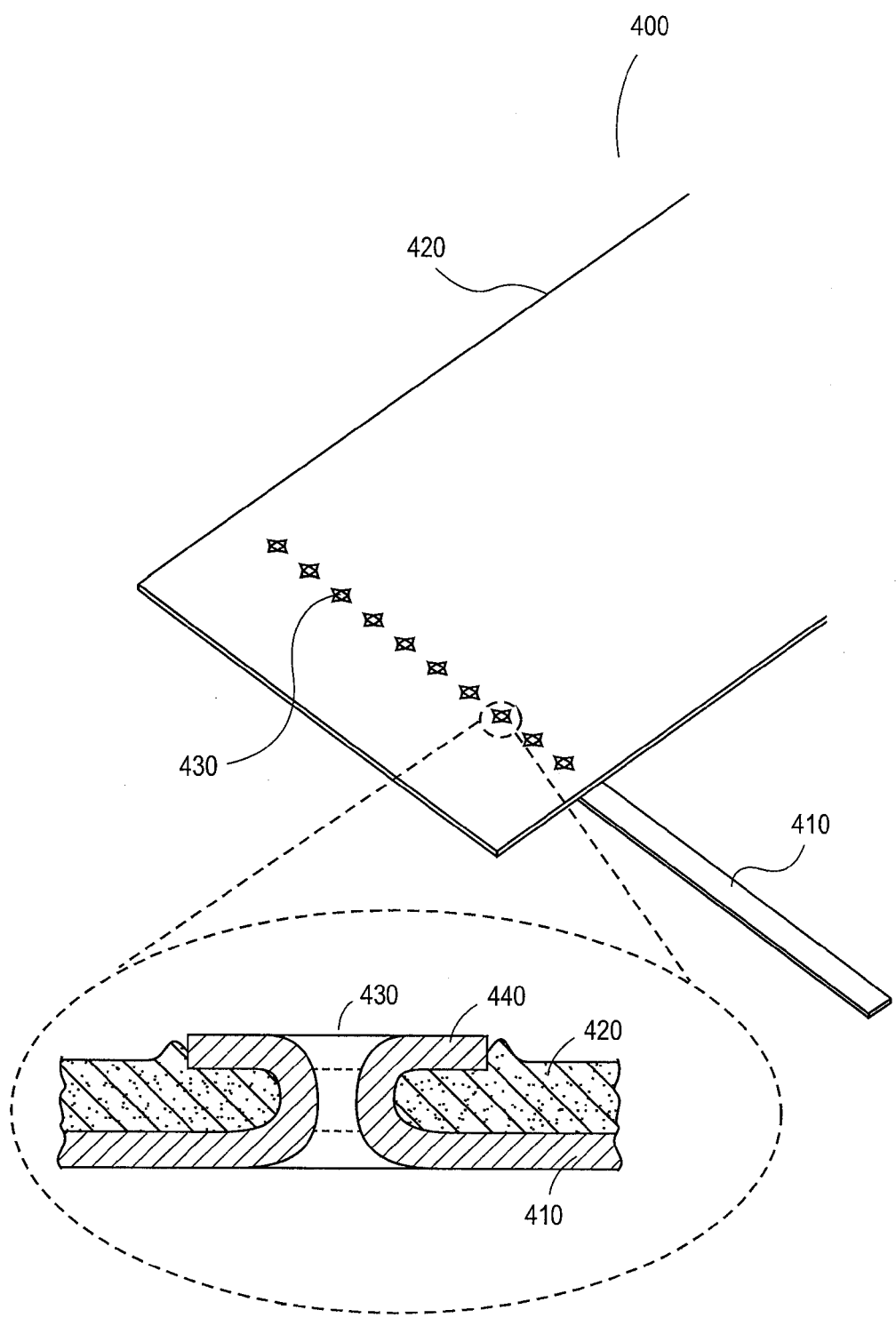
FIG. 4 illustrates a tabbed positive electrode prepared through staking according to an embodiment of the invention.

FIG. 4 shows a prototype of electrochemical cell having tabs attached to the electrodes according to the same embodiment as that of FIG. 3, but showing the opposite side. Tab 410 is staked onto positive electrode 420 by multiple pierced openings, such as opening 430. The cross-sectional view shows the pierced opening 430 in greater detail, including a tang 440. The multiple pierced openings have provided a strong and durable physical contact between tab 410 and electrode 420 to ensure the minimal electronic impedance.

Figure 5:
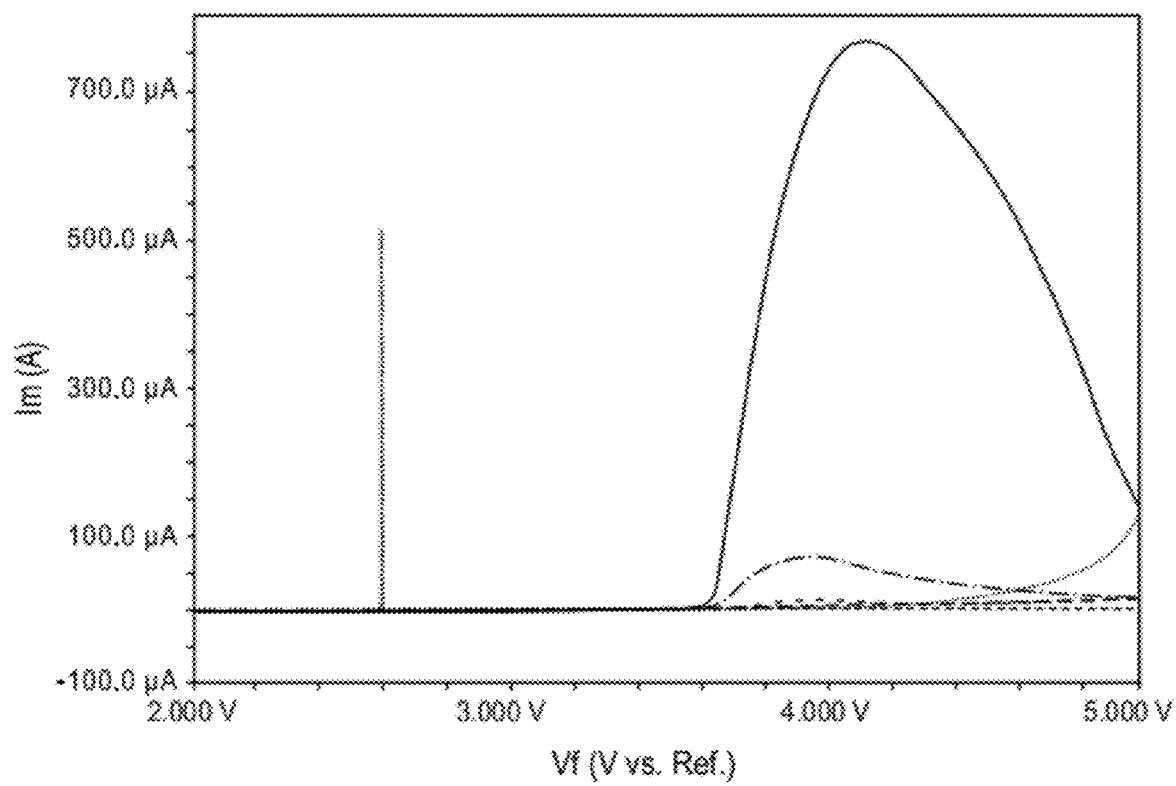
FIG. 5 illustrates a cyclic voltammetry profile of an electrolyte with an aluminum tab. The scanning rate is 10 mV/s.

FIG. 5 shows a cyclic voltammetry diagram of an electrolyte in the presence of an aluminum tab according to an embodiment of the present invention. FIG. 5 shows an oxidation potential at 3.7 V indicating the onset of corrosion occurs at about 3.7 V. In one instance, the scan rate is 10 mv/s. In certain instances, the electrolytes are compounds having formula (I). In other instances, the electrolytes are compounds having the formula: a compound having the formula: $(R^aSO_2)N^-Li^+(SO_2R^a)$, wherein each $R^a$ is independently $C_{1-8}$perfluoroalkyl or perfluoroaryl. In one instance, the electrolyte is lithium bis(trifluoromethanesufonyl)amide (LiTfsi). Various electrolytes as described below can be used. In one instance, the electrolyte has a concentration of 1.2 M. Various solvents as described below can be used. Exemplary solvents include a mixture of ethylene carbonate, dimethyl carbonate, and ethylmethyl carbonate at a ratio of 1:1:1 or a mixture of ethylene carbonate/diethyl carbonate at a ratio of 1:1.

Figure 6:
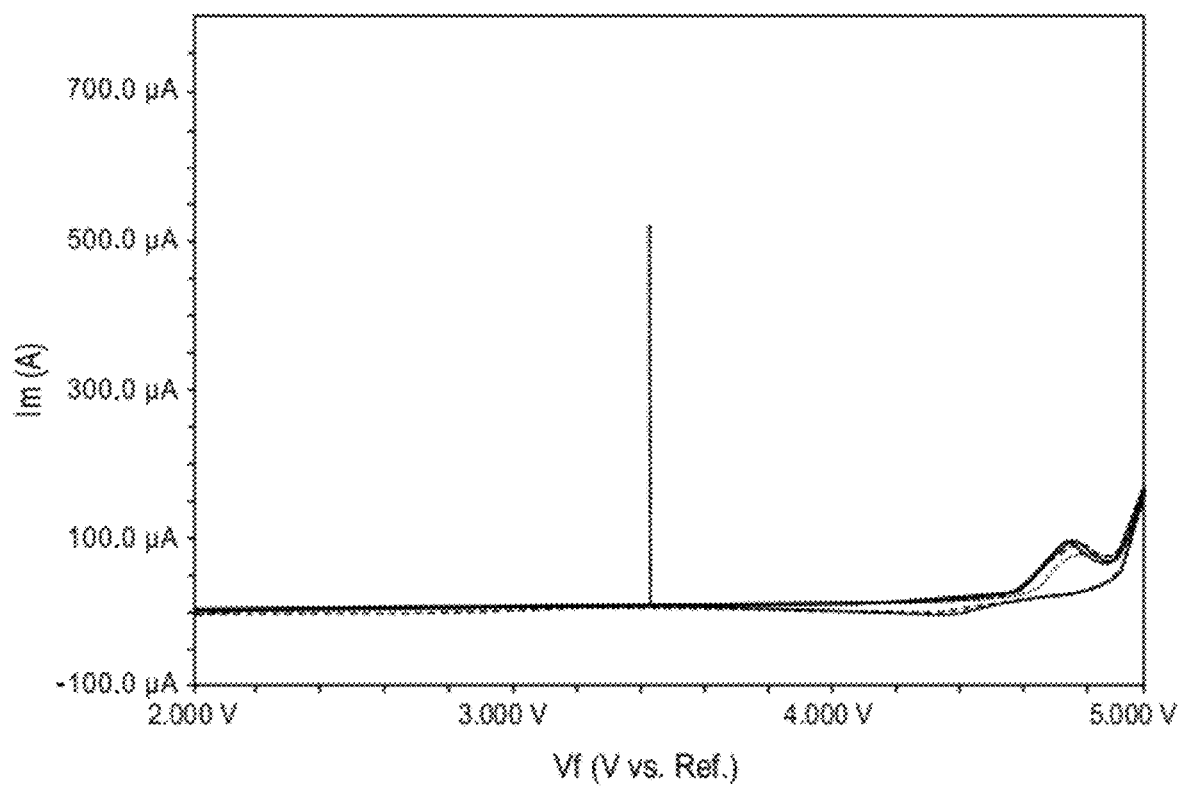
FIG. 6 illustrates a cyclic voltammetry profile of an electrolyte with a gold or gold coated tab. The scanning rate is 10 mV/s.

FIG. 6 shows a comparison cyclic voltammetry diagram of an electrolyte in the presence of a gold tab according to an embodiment of the present invention. In certain instances, the electrolytes are compounds having formula (I). In other instances, the electrolytes are compounds having the formula: a compound having the formula: $(R^aSO_2)N^- Li^+(SO_2R^a)$, wherein each $R^a$ is independently $C_{1-8}$perfluoroalkyl or perfluoroaryl. In one instance, the electrolyte is lithium bis(trifluoromethanesufonyl)amide (LiTfsi). FIG. 6 shows that no oxidation occurs until about 4.5 V. In one instance, the scan rate is 10 mv/s. In one instance, the electrolyte is lithium bis(trifluoromethanesufonyl)amide (LiTfsi). Various electrolyte as described below can be used. In one instance, the electrolyte has a concentration of 1.2 M. Various solvents as described below can be used. Exemplary solvents include a mixture of ethylene carbonate, dimethyl carbonate, and ethylmethyl carbonate at a ratio of 1:1:1 or a mixture of ethylene carbonate/diethyl carbonate at a ratio of 1:1.

In one embodiment, the present invention provides a positive electrode, which includes electrode active materials and a current collector. The positive electrode has an upper charging voltage of 3.5-4.5 volts versus a Li/Li$^+$ reference electrode. The upper charging voltage is the maximum voltage to which the positive electrode may be charged at a low rate of charge and with significant reversible storage capacity. In some embodiments, cells utilizing positive electrode with upper charging voltages from 3-5.8 volts versus a Li/Li$^+$ reference electrode are also suitable. A variety of positive electrode active materials can be used. Non-limiting exemplary electrode active materials include transition metal oxides, phosphates and sulfates, and lithiated transition metal oxides, phosphates and sulfates.

In some embodiments, the electrode active materials are oxides with empirical formula $Li_xMO_2$, where M is a transition metal ions selected from the group consisting of Mn, Fe, Co, Ni, Al, Mg, Ti, V, and a combination thereof, with a layered crystal structure, the value x may be between about 0.01 and about 1, suitably between about 0.5 and about 1, more suitably between about 0.9 to 1. In yet some other embodiments, the active materials are oxides with empirical formula $Li_{1+x} M_{2-y}O_4$, where M is a transition metal ions selected from the group consisting of Mn, Co, Ni, Al, Mg, Ti, V, and a combination thereof, with a spinel crystal structure, the value x may be between about −0.11 and 0.33, suitably between about 0 and about 0.1, the value of y may be between about 0 and 0.33, suitably between 0 and 0.1. In yet some other embodiments the active materials are vanadium oxides such as $LiV_2O_5$, $LiV_6O_{13}$, $Li_xV_2O_5$, $Li_xV_6O_{13}$, wherein x is 0<x<1 or the foregoing compounds modified in that the compositions thereof are nonstoichiometric, disordered, amorphous, overlithiated, or underlithiated forms such as are known in the art. The suitable positive electrode-active compounds may be further modified by doping with less than 5% of divalent or trivalent metallic cations such as $Fe^{2+}$, $Ti^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$, $Co^{3+}$, or $Mn^{3+}$, and the like. In some other embodiments, positive electrode active materials suitable for the positive electrode composition include lithium insertion compounds with olivine structure such as $Li_xMXO_4$ where M is a transition metal ions selected from the group consisting of Fe, Mn, Co, Ni, and a combination thereof, and X is a selected from a group consisting of P, V, S, Si and combinations thereof, the value of the value x may be between about 0 and 2. In some other embodiments, the active materials with NASICON structures such as $Y_xM_2(XO_4)_3$, where Y is Li or Na, or a combination thereof, M is a transition metal ion selected from the group consisting of Fe, V, Nb, Ti, Co, Ni, Al, or the combinations thereof, and X is selected from a group of P, S, Si, and combinations thereof and value of x between 0 and 3. The examples of these materials are disclosed by J. B. Goodenough in "Lithium Ion Batteries" (Wiley-VCH press, Edited by M. Wasihara and 0. Yamamoto). Particle size of the electrode materials are preferably between 1 nm and 100 μm, more preferably between 10 nm and 100 μm, and even more preferably between 1 μm and 100 μm.

In some embodiments, the electrode active materials are oxides such as $LiCoO_2$, spinel $LiMn_2O_4$, chromium-doped spinel lithium manganese oxides $Li_xCr_yMn_2O_4$, layered $LiMnO_2$, $LiNiO_2$, $LiNi_xCo_{1-x}$, $O_2$ where x is 0<x<1, with a preferred range of 0.5<x<0.95, and vanadium oxides such as $LiV_2O_5$, $LiV_6O_{13}$, $Li_xV_2O_5$, $Li_xV_6O_{13}$, where x is 0<x<1, or the foregoing compounds modified in that the compositions thereof are nonstoichiometric, disordered, amorphous, overlithiated, or underlithiated forms such as are known in the art. The suitable positive electrode-active compounds may be further modified by doping with less than 5% of divalent or trivalent metallic cations such as $Fe^{2+}$, $Ti^{2+}$, $Zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$, $Co^{3+}$, or $Mn^{3+}$, and the like. In some other embodiments, positive electrode active materials suitable for the positive electrode composition include lithium insertion compounds with olivine structure such as $LiFePO_4$ and with NASICON structures such as $LiFeTi(SO_4)_3$, or those disclosed by J. B. Goodenough in "Lithium Ion Batteries" (Wiley-VCH press, Edited by M. Wasihara and O. Yamamoto). In yet some other embodiments, electrode active materials include $LiFePO_4$, $LiMnPO_4$, $LiVPO_4$, $LiFeTi(SO_4)_3$, $LiNi_xMn_{1-3}O_2$, $LiNi_xCo_yMn_{1-x-y}O_2$ and derivatives thereof, wherein x is 0<x<1 and y is 0<y<1. In certain instances, x is between about 0.25 and 0.9. In one instance, x is ⅓ and y is ⅓. Particle size of the positive electrode active material should range from about 1 to 100 microns. In some preferred embodiments, transition metal oxides such as $LiCoO_2$, $LiMn_2O_4$, $LiNiO_2$, $LiNi_xMn_{1-x}O_2$, $LiNi_xCo_yMn_{1-x-y}O_2$ and their derivatives, where x is 0<x<1 and y is 0<y<1. $LiNi_xMn_{1-x}O_2$ can be prepared by heating a stoichiometric mixture of electrolytic $MnO_2$, LiOH and nickel oxide to about 300 to 400° C. In some other embodiments, the electrode active materials are $xLi_2MnO_3(1-x)LiMO_2$ or $LiM'PO_4$, where M is selected from Ni, Co, Mn, $LiNiO_2$ or $LiNi_xCo_{1-x}O_2$; M' is selected from the group consisting of Fe, Ni, Mn and V; and x and y are each independently a real number between 0 and 1. $LiNi_xCo_yMn_{1-x-y}O_2$ can be prepared by heating a stoichiometric mixture of electrolytic $MnO_2$, LiOH, nickel oxide and cobalt oxide to about 300 to 500° C. The positive electrode may contain conductive additives from 0% to about 90%, preferably the additive is less than 5%. In one embodiment, the subscripts x and y are each independently selected from 0.1, 0.15, 0.2, 0.25, 0.3, 0.35, 0.4, 0.45, 0.5, 0.55, 0.6, 0.65, 0.7, 0.75, 0.8, 0.85, 0.9 or 0.95. x and y can be any numbers between 0 and 1 to satisfy the charge balance of the compounds $LiNi_xMn_{1-x}O_2$ and $LiNi_xCo_yMn_{1-x-y}O_2$.

Representative positive electrodes and their approximate recharged potentials include $FeS_2$ (3.0 V vs. $Li/Li^+$), $LiCoPO_4$ (4.8 V vs. $Li/Li^+$), $LiFePO_4$ (3.45 V vs. $Li/Li^+$), $Li_2FeS_2$ (3.0 V vs. $Li/Li^+$), $Li_2FeSiO_4$ (2.9 V vs. $Li/Li^+$), $LiMn_2O_4$ (4.1 V vs. $Li/Li^+$), $LiMnPO_4$ (4.1 V vs. $Li/Li^+$), $LiNiPO_4$ (5.1 V vs. $Li/Li^+$), $LiV_3O_8$ (3.7 V vs. $Li/Li^+$), $LiV_6O_{13}$ (3.0 V vs. $Li/Li^+$), $LiVOPO_4$ (4.15 V vs. $Li/Li^+$), $LiVOPO_4F$ (4.3 V vs. $Li/Li^+$), $Li_3V_2(PO_4)_3$ (4.1 V (2 Li) or 4.6 V (3 Li) vs. $Li/Li^+$), $MnO_2$ (3.4 V vs. $Li/Li^+$), $MoS_3$ (2.5 V vs. $Li/Li^+$), sulfur (2.4 V vs. $Li/Li^+$), $TiS_2$ (2.5 V vs. $Li/Li^+$), $TiS_3$ (2.5 V vs. $Li/Li^+$), $V_2O_5$ (3.6 V vs. $Li/Li^+$), $V_6O_{13}$ (3.0 V vs. $Li/Li^+$), and combinations thereof.

A positive electrode can be formed by mixing and forming a composition comprising, by weight, 0.01-15%, preferably 2-15%, more preferably 4-8%, of a polymer binder, 10-50%, preferably 15-25%, of the electrolyte solution of the invention herein described, 40-85%, preferably 65-75%, of an electrode-active material, and 1-12%, preferably 4-8%, of a conductive additive. Optionally, up to 12% of inert filler may also be added, as may such other adjuvants as may be desired by one of skill in the art, which do not substantively affect the achievement of the desirable results of the present invention. In one embodiment, no inert filler is used.

In one embodiment, the present invention provides a negative electrode, which includes electrode active materials and a current collector. The negative electrode comprises either a metal selected from the group consisting of Li, Si, Sn, Sb, Al and a combination thereof, or a mixture of one or more negative electrode active materials in particulate form, a binder, preferably a polymeric binder, optionally an electron conductive additive, and at least one organic carbonate. Examples of useful negative electrode active materials include, but are not limited to, lithium metal, carbon (graphites, coke-type, mesocarbons, polyacenes, carbon nanotubes, carbon fibers, and the like). Negative electrode-active materials also include lithium-intercalated carbon, lithium metal nitrides such as $Li_{2.6}Co_{0.4}N$, metallic lithium alloys such as LiAl or $Li_4Sn$, lithium-alloy-forming compounds of tin, silicon, antimony, or aluminum such as those disclosed in "*Active/Inactive Nanocomposites as Anodes for Li-Ion Batteries*," by Mao et al. in Electrochemical and Solid State Letters, 2 (1), p. 3, 1999. Further included as negative electrode-active materials are metal oxides such as titanium oxides, iron oxides, or tin oxides. When present in particulate form, the particle size of the negative electrode active material should range from about 0.01 to 100 microns, preferably from 1 to 100 microns. Some preferred negative electrode active materials include graphites such as carbon microbeads, natural graphites, carbon nanotubes, carbon fibers, or graphitic flake-type materials. Some other preferred negative electrode active materials are graphite microbeads and hard carbon, which are commercially available.

A negative electrode can be formed by mixing and forming a composition comprising, by weight, 0.01-20%, or 1-20%, preferably 2-20%, more preferably 3-10%, of a polymer binder, 10-50%, preferably 14-28%, of the electrolyte solution of the invention herein described, 40-80%, preferably 60-70%, of electrode-active material, and 0-5%, preferably 1-4%, of a conductive additive. Optionally up to 12% of an inert filler as hereinabove described may also be added, as may such other adjuvants as may be desired by one of skill in the art, which do not substantively affect the achievement of the desirable results of the present invention. It is preferred that no inert filler be used.

Suitable conductive additives for the positive and negative electrode composition include carbons such as coke, carbon black, carbon nanotubes, carbon fibers, and natural graphite, metallic flake or particles of copper, stainless steel, nickel or other relatively inert metals, conductive metal oxides such as titanium oxides or ruthenium oxides, or electronically-conductive polymers such as polyacetylene, polyphenylene and polyphenylenevinylene, polyaniline or polypyrrole. Preferred additives include carbon fibers, carbon nanotubes and carbon blacks with relatively surface area below ca. 100 m²/g such as Super P and Super S carbon blacks available from MMM Carbon in Belgium.

The current collector suitable for the positive and negative electrodes includes a metal foil and a carbon sheet selected from a graphite sheet, carbon fiber sheet, carbon foam and carbon nanotubes sheet or film. High conductivity is generally achieved in pure graphite and carbon nanotubes film so it is preferred that the graphite and nanotube sheeting contain as few binders, additives and impurities as possible in order to realize the benefits of the present invention. Carbon nanotubes can be present from 0.01% to about 99%. Carbon fiber can be in microns or submicrons. Carbon black or carbon nanotubes may be added to enhance the conductivities of the certain carbon fibers. In one embodiment, the negative electrode current collector is a metal foil, such as copper foil. The metal foil can have a thickness from about 5 to about 300 micrometers.

The carbon sheet current collector suitable for the present invention may be in the form of a powder coating on a substrate such as a metal substrate, a free-standing sheet, or a laminate. That is the current collector may be a composite structure having other members such as metal foils, adhesive layers and such other materials as may be considered desirable for a given application. However, in any event, according to the present invention, it is the carbon sheet layer, or carbon sheet layer in combination with an adhesion promoter, which is directly interfaced with the electrolyte of the present invention and is in electronically conductive contact with the electrode surface.

In some embodiments, resins are added to fill into the pores of carbon sheet current collectors to prevent the passing through of electrolyte. The resin can be conductive or non-conductive. Non-conductive resins can be used to increase the mechanical strength of the carbon sheet. The use of conductive resins have the advantage of increasing initial charge efficiency, decrease surface area where passivation occurs due to the reaction with the electrolyte. The conductive resin can also increase the conductivity of the carbon sheet current collector.

The flexible carbon sheeting preferred for the practice of the present invention is characterized by a thickness of at most 2000 micrometers, with less than 1000, preferred, less than 300 more preferred, less than 75 micrometers even more preferred, and less than 25 micrometers most preferred. The flexible carbon sheeting preferred for the practice of the invention is further characterized by an electrical conductivity along the length and width of the sheeting of at least 1000 Siemens/cm (S/cm), preferably at least 2000 S/cm, most preferably at least 3000 S/cm measured according to ASTM standard C611-98.

The flexible carbon sheeting preferred for the practice of the present invention may be compounded with other ingredients as may be required for a particular application, but carbon sheet having a purity of ca. 95% or greater is highly preferred. In some embodiments, the carbon sheet has a purity of greater than 99%. At a thickness below about 10 µm, it may be expected that electrical resistance could be unduly high, so that thickness of less than about 10 µm is less preferred.

In some embodiments, the carbon current collector is a flexible free-standing graphite sheet. The flexible free-standing graphite sheet cathode current collector is made from expanded graphite particles without the use of any binding material. The flexible graphite sheet can be made from natural graphite, Kish flake graphite, or synthetic graphite that has been voluminously expanded so as to have $d_{002}$ dimension at least 80 times and preferably 200 times the original $d_{002}$ dimension. Expanded graphite particles have excellent mechanical interlocking or cohesion properties that can be compressed to form an integrated flexible sheet without any binder. Natural graphites are generally found or obtained in the form of small soft flakes or powder. Kish graphite is the excess carbon which crystallizes out in the course of smelting iron. In one embodiment, the current collector is a flexible free-standing expanded graphite. In another embodiment, the current collector is a flexible free-standing expanded natural graphite.

A binder is optional, however, it is preferred in the art to employ a binder, particularly a polymeric binder, and it is preferred in the practice of the present invention as well. One of skill in the art will appreciate that many of the polymeric materials recited below as suitable for use as binders will also be useful for forming ion-permeable separator membranes suitable for use in the lithium or lithium-ion battery of the invention.

Suitable binders include, but are not limited to, polymeric binders, particularly gelled polymer electrolytes comprising polyacrylonitrile, poly(methylmethacrylate), poly(vinyl chloride), and polyvinylidene fluoride and copolymers thereof. Also, included are solid polymer electrolytes such as polyether-salt based electrolytes including poly(ethylene oxide)(PEO) and its derivatives, poly(propylene oxide) (PPO) and its derivatives, and poly(organophosphazenes) with ethyleneoxy or other side groups. Other suitable binders include fluorinated ionomers comprising partially or fully fluorinated polymer backbones, and having pendant groups comprising fluorinated sulfonate, imide, or methide lithium salts. Preferred binders include polyvinylidene fluoride and copolymers thereof with hexafluoropropylene, tetrafluoroethylene, fluorovinyl ethers, such as perfluoromethyl, perfluoroethyl, or perfluoropropyl vinyl ethers; and ionomers comprising monomer units of polyvinylidene fluoride and monomer units comprising pendant groups comprising fluorinated carboxylate, sulfonate, imide, or methide lithium salts.

Gelled polymer electrolytes are formed by combining the polymeric binder with a compatible suitable aprotic polar solvent and, where applicable, the electrolyte salt. PEO and PPO-based polymeric binders can be used without solvents. Without solvents, they become solid polymer electrolytes, which may offer advantages in safety and cycle life under some circumstances. Other suitable binders include so-called "salt-in-polymer" compositions comprising polymers having greater than 50% by weight of one or more salts. See, for example, M. Forsyth et al, *Solid State Ionics,* 113, pp 161-163 (1998).

Also included as binders are glassy solid polymer electrolytes, which are similar to the "salt-in-polymer" compositions except that the polymer is present in use at a temperature below its glass transition temperature and the salt concentrations are ca. 30% by weight. In one embodiment, the volume fraction of the preferred binder in the finished electrode is between 4 and 40%.

The ion conductive medium typically comprises a electrolyte solution, which includes a lithium salt of formula (I):

$$R^1\text{—}X^-(Li^+)R^2(R^3)_m, \quad (I)$$

dissolved in a solvent. The ion conductive medium is preferably electronically insulative. The substituents $R^1$, $R^2$ and $R^3$ are each independently an electron-withdrawing group selected from the group consisting of —CN, —SO$_2$R$^a$, —SO$_2$-L$^a$-SO$_2$N$^-$Li$^+$SO$_2$R$^a$, —P(O)(OR$^a$)$_2$, —P(O)(R$^a$)$_2$, —CO$_2$R$^a$, —C(O)R$^a$ and —H. Each R$^a$ is independently selected from the group consisting of $C_{1-8}$ alkyl, $C_{1-8}$ haloalkyl, $C_{1-8}$ perfluoroalkyl, aryl, perfluoroaryl, optionally substituted barbituric acid and optionally substituted thiobarbituric acid, wherein at least one carbon-carbon bond of the alkyl or perfluoroalkyl are optionally substituted with a member selected from —O— or —S— to form an ether or a thioether linkage and the aryl is optionally substituted with from 1-5 members selected from the group consisting of halogen, $C_{1-4}$haloalkyl, $C_{1-4}$perfluoroalkyl, —CN, —SO$_2$R$^b$, —P(O)(OR$^b$)$_2$, —P(O)(R$^b$)$_2$, —CO$_2$R$^b$ and —C(O)R$^b$, wherein R$^b$ is $C_{1-8}$ alkyl or $C_{1-8}$ perfluoroalkyl, and L$^a$ is $C_{1-4}$perfluoroalkylene. In one embodiment, R$^1$ is —SO$_2$Ra In some instances, R$^1$ is —SO$_2$(C$_{1-8}$perfluoroalkyl). For example, R$^1$ is —SO$_2$CF$_3$, —SO$_2$CF$_2$CF$_3$ and the like. In some other instances, when m is 0, R$^1$ is —SO$_2$(C$_{1-8}$perfluoroalkyl) and $R^2$ is —$SO_2(C_{1-8}$perfluoroalkyl) or —$SO_2$(—$R^a$—$SO_2Li^+$)$SO_2$—$R^a$, wherein $R^a$ is $C_{1-8}$perfluoroalkyl, optionally substituted with from 1-4-O—. For example, each $R^a$ is independently selected from the group consisting of —$CF_3$, —$CF_2CF_3$, —$CF_2$—$SCF_3$, —$CF_2$—$OCF_3$, $C_{1-8}$fluoroalkyl, perfluorophenyl, trifluorophenyl and bis-trifluorophenyl.

In one embodiment of compounds having formula I, $R^1$ is —$SO_2(C_{1-8}$fluoroalkyl). $C_{1-8}$fluoroalkyl includes alkyls having up to 17 fluorine atoms and is also meant to include various partially fluorinated alkyls, such as —$CH_2CF_3$, —$CH_2$—$OCF_3$, —$CF_2CH_3$, —$CHFCHF_2$, —$CHFCF_3$, —$CF_2CH_2CF_3$ and the like.

In compounds of formula I, $L^a$ is $C_{1-4}$perfluoroalkylene, such as —$CF_2$—, —$CF_2CF_2$—, —$CF_2CF_2CF_2$—, —$CF_2CF_2CF_2CF_2$— and isomers thereof.

The symbol X is N when m is 0. X is C when m is 1.

In certain embodiments, the compounds have the formula: $(R^aSO_2)N^-Li^+(SO_2R^a)$, wherein each $R^a$ is independently $C_{1-8}$perfluoroalkyl or perfluoroaryl, such as perfluorophenyl.

In certain embodiments, the compounds of formula I is selected from the group consisting of: $CF_3SO_2N^-(Li^+)$ $SO_2CF_3$, $CF_3CF_2SO_2N^-(Li^+)SO_2CF_3$, $CF_3CF_2SO_2N^-(Li^+)$ $SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)$ $SO_2CF_3$, $C_6F_5SO_2N^-(Li^+)SO_2C_6F_5$ and $CF_3SO_2N^-(Li^+)$ $SO_2PhCF_3$.

In one embodiment, the compounds of formula I has a subformula Ia:

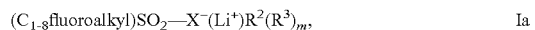
(C$_{1-8}$fluoroalkyl)SO$_2$—X$^-$(Li$^+$)R$^2$(R$^3$)$_m$,        Ia where the substituents are as defined above.

In another embodiment, the compounds of formula I has a subformula Ia-1:

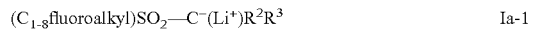
(C$_{1-8}$fluoroalkyl)SO$_2$—C$^-$(Li$^+$)R$^2$R$^3$        Ia-1 where the substituents are as defined above.

In another embodiment, the compounds of formula I has a subformula Ia-2:

(C$_{1-8}$fluoroalkyl)SO$_2$—N$^-$(Li$^+$)R$^2$        Ia-2 where the substituents are as defined above.

Electrolyte solvents can be aprotic liquids or polymers. Included are organic carbonates and lactones. Organic carbonates include a compound having the formula: $R^4OC(=O)OR^5$, wherein $R^4$ and $R^5$ are each independently selected from the group consisting of $C_{1-4}$alkyl and $C_{3-6}$cycloalkyl, or together with the atoms to which they are attached to form a 4- to 8-membered ring, wherein the ring carbons are optionally substituted with 1-2 members selected from the group consisting of halogen, $C_{1-4}$alkyl and $C_{1-4}$haloalkyl. In one embodiment, the organic carbonates include propylene carbonate, dimethyl carbonate, ethylene carbonate, diethyl carbonate, ethylmethyl carbonate and a mixture thereof as well as many related species. The lactone is selected from the group consisting of β-propiolactone, γ-butyrolactone, 67-valerolactone, δ-caprolactone, hexano-6-lactone and a mixture thereof, each of which is optionally substituted with from 1-4 members selected from the group consisting of halogen, $C_{1-4}$alkyl and $C_{1-4}$haloalkyl. Also included are solid polymer electrolytes such as polyethers and poly(organo phosphazenes). Further included are lithium salt-containing ionic liquid mixtures such as are known in the art, including ionic liquids such as organic derivatives of the imidazolium cation with counterions based on imides, methides, PF6$^-$, or BF$_4^-$. See for example, MacFarlane et al., *Nature*, 402, 792 (1999). Mixtures of suitable electrolyte solvents, including mixtures of liquid and polymeric electrolyte solvents are also suitable.

The electrolyte solution suitable for the practice of the invention is formed by combining the lithium imide or methide salts of compounds of formula I with optionally a co-salt selected from $LiPF_6$, $LiBF_4$, $LiAsF_6$, $LiB(C_2O_4)_2$, (Lithium bis(oxalato)borate), or $LiClO_4$, along with a non-aqueous electrolyte solvent by dissolving, slurrying or melt mixing as appropriate to the particular materials. The present invention is operable when the concentration of the imide or methide salt is in the range of 0.2 to up to 3 molar, but 0.5 to 2 molar is preferred, with 0.8 to 1.2 molar most preferred. Depending on the fabrication method of the cell, the electrolyte solution may be added to the cell after winding or lamination to form the cell structure, or it may be introduced into the electrode or separator compositions before the final cell assembly.

The electrochemical cell optionally contains an ion conductive layer. The ion conductive layer suitable for the lithium or lithium-ion battery of the present invention is any ion-permeable shaped article, preferably in the form of a thin film, membrane or sheet. Such ion conductive layer may be an ion conductive membrane or a microporous film such as a microporous polypropylene, polyethylene, polytetrafluoroethylene and layered structures thereof. Suitable ion conductive layer also include swellable polymers such as polyvinylidene fluoride and copolymers thereof. Other suitable ion conductive layer include those known in the art of gelled polymer electrolytes such as poly(methyl methacrylate) and poly(vinyl chloride). Also suitable are polyethers such as poly(ethylene oxide) and poly(propylene oxide). Preferable are microporous polyolefin separators, separators comprising copolymers of vinylidene fluoride with hexafluoropropylene, perfluoromethyl vinyl ether, perfluoroethyl vinyl ether, or perfluoropropyl vinyl ether, including combinations thereof, or fluorinated ionomers, such as those described in Doyle et al., U.S. Pat. No. 6,025,092.

In another aspect, the present invention provides a method of connecting a tab to an electrode in an electrochemical cell. The method includes (a) providing an electrode comprising an electrode active material and a carbon current collector in electronically conductive contact with the electrode; (b) providing a tab having a first attachment end for attaching to the electrode; and (c) connecting the first attachment end of the tab to the carbon current collector through a process selected from the group consisting of riveting, conductive adhesive lamination, staking, hot press, ultrasonic press, mechanical press, crimping, pinching, and a combination thereof In one embodiment, the electrochemical cell is a lithium-ion electrochemical cell.

In one embodiment, the method includes aligning the carbon current collector with the tab and applying riveting, staking, conductive adhesive lamination, hot press, ultrasonic press, mechanical press, crimping, pinching, and a combination thereof to the carbon current collector. The tab can have various shapes, such as a U-shape, a V-shape, a L-shape, a rectangular-shape or a inverted T-shape. In one instance, the carbon current collector and the tab can be aligned to any desirable position for attachment. The carbon current collector can be aligned to any suitable part of the tab. For example, the carbon current collector is aligned to the middle, the side or a predetermined position of the tab. The tab and the current collector are joined together through riveting or staking.

In another embodiment, the tab is connected to the carbon current collector through a conductive adhesive layer. In certain instances, the conductive layer is deposited on the tab. In one instance, the conductive layer is an adhesive layer comprising a conductive filler and a binder. The conductive filler is selected from the group consisting of carbon black, conducting polymers, carbon nanotubes and carbon composite materials. The conductive layer can have a thickness from about 1 nm to about 1000 micrometers. For example, the conductive layer has a thickness of about 1, 10, 20, 30, 40, 50, 60, 70, 80, 90 100, 200, 300, 400, 500, 600, 700, 800, 900 or 1000 nm. The conductive layer can also have a thickness of about 1, 10, 20, 30, 40, 50, 60, 70, 80, 90 100, 200, 300, 400, 500, 600, 700, 800, 900 or 1000 µm.

In another aspect, the present invention provides a battery. The battery includes a housing, a positive connector, a negative connector, a electrochemical cell disposed in the housing, where the positive and the negative connector are mounted on the housing. In one embodiment, the housing is a sealed container. In yet another embodiment, the tab is connected to the carbon current collector through a conductive adhesive layer then riveted, hot pressed, ultrasonic pressed, mechanical pressed, staked, crimped, or pinched.

In one embodiment, both the positive connector and the negative connectors have an inner end disposed within the housing and an outer end protrudes outside the housing. The positive electrode tab is welded to the inner end of the positive connector and the negative electrode tab is welded to the inner end of the negative connector to provide a battery having a positive outer end and a negative outer end for connecting to external devices. For example, the battery can have multiple tabs welded to the positive connector or the negative connector. The battery can be prepared by first attaching the tabs to the electrodes of the lithium-ion electrochemical cell. The electrodes and separator layers are then jelly-wound or stacked and placed in a battery container. The tabs for the positive electrode are welded to the inner end of the positive connector of the housing, and the tabs for the negative electrode are welded to the inner end of the negative connector of the housing. The housing is sealed and no tabs are exposed. In one embodiment, the housing is a container.

In another embodiment, the second attachment ends of the tabs of the battery are protruded outside the housing for connecting to an external device. For example, the battery can be prepared by first attaching the tabs to the electrodes of a lithium-ion electrochemical cell. The electrodes and separator are then jelly-wound or stacked and placed in a housing then sealed with only the tabs are protruded outside the housing. In one embodiment, the housing is a container.

In another embodiment, the carbon current collector for the positive electrode and/or the carbon current collector for the negative electrode protrude outside the housing. In one instance, the housing is a foil-polymer laminate package. The pores in the carbon current collector are closed or sealed by a resin or other material to provide as close to a hermetic seal as possible when the carbon current collector(s) are heat-sealed between two layers of the foil-laminate. The resins can be conductive or non-conductive resins.

The benefit of this design is that the metal tabs can be attached to the carbon current collectors outside of the cell and are not in contact with the corrosive electrolyte solution. This allows the use of a plurality of metals, metal alloys or composites.

The Li-ion electrochemical cell can be assembled according to any method known in the art (see, U.S. Pat. Nos. 5,246,796; 5,837,015; 5,688,293; 5,456,000; 5,540,741; and 6,287,722 as incorporated herein by reference). In a first method, electrodes are solvent-cast onto current collectors, the collector/electrode tapes are spirally wound along with microporous polyolefin separator films to make a cylindrical roll, the winding placed into a metallic cell case, and the nonaqueous electrolyte solution impregnated into the wound cell.

In a second method electrodes are solvent-cast onto current collectors and dried, the electrolyte and a polymeric gelling agent are coated onto the separators and/or the electrodes, the separators are laminated to, or brought in contact with, the collector/electrode tapes to make a cell subassembly, the cell subassemblies are then cut and stacked, or folded, or wound, then placed into a foil-laminate package, and finally heat treated to gel the electrolyte. In a third method, electrodes and separators are solvent cast with also the addition of a plasticizer; the electrodes, mesh current collectors, electrodes and separators are laminated together to make a cell subassembly, the plasticizer is extracted using a volatile solvent, the subassembly is dried, then by contacting the subassembly with electrolyte the void space left by extraction of the plasticizer is filled with electrolyte to yield an activated cell, the subassembly(s) are optionally stacked, folded, or wound, and finally the cell is packaged in a foil laminate package. In a fourth method, the electrode and separator materials are dried first, then combined with the salt and electrolyte solvent to make active compositions; by melt processing the electrodes and separator compositions are formed into films, the films are laminated to produce a cell subassembly, the subassembly(s) are stacked, folded, or wound and then packaged in a foil-laminate container. In a fifth method, electrodes and separator are either spirally wound or stacked; polymeric binding agent (e.g., polyvinylidene (PVDF) or equivalent) is on separator or electrodes, after winding or stacking, heat lamination to melt the binding agent and adhere the layers together followed by electrolyte fill.

In one embodiment, the electrodes can conveniently be made by dissolution of all polymeric components into a common solvent and mixing together with the carbon black particles and electrode active particles. For example, a lithium battery electrode can be fabricated by dissolving polyvinylidene (PVDF) in 1-methyl-2-pyrrolidinone or poly (PVDF-co-hexafluoropropylene (HFP)) copolymer in acetone solvent, followed by addition of particles of electrode active material and carbon black or carbon nanotubes, followed by deposition of a film on a substrate and drying. The resultant electrode will comprise electrode active material, conductive carbon black or carbon nanotubes, and polymer. This electrode can then be cast from solution onto a suitable support such as a glass plate or a current collector, and formed into a film using techniques well known in the art.

The positive electrode is brought into electronically conductive contact with the graphite current collector with as little contact resistance as possible. This may be advantageously accomplished by depositing upon the graphite sheet a thin layer of an adhesion promoter such as a mixture of an acrylic acid-ethylene copolymer and carbon black. Suitable contact may be achieved by the application of heat and/or pressure to provide intimate contact between the current collector and the electrode.

The flexible carbon sheeting, such as carbon nanotubes or graphite sheet for the practice of the present invention provides particular advantages in achieving low contact resistance. By virtue of its high ductility, conformability, and toughness it can be made to form particularly intimate and therefore low resistance contacts with electrode structures that may intentionally or unintentionally proffer an uneven contact surface. In any event, in the practice of the present invention, the contact resistance between the positive electrode and the graphite current collector of the present invention preferably does not exceed 50 ohm-cm$^2$, in one instance, does not exceed 10 ohms-cm$^2$, and in another instance, does not exceed 2 ohms-cm$^2$. Contact resistance can be determined by any convenient method as known to one of ordinary skill in the art. Simple measurement with an ohm-meter is possible.

The negative electrode is brought into electronically conductive contact with an negative electrode current collector. The negative electrode current collector can be a metal foil, a mesh or a carbon sheet. In one embodiment, the current collector is a copper foil or mesh. In a preferred embodiment, the negative electrode current collector is a carbon sheet selected from a graphite sheet, carbon fiber sheet or a carbon nanotube sheet. As in the case of the positive electrode, an adhesion promoter can optionally be used to attach the negative electrode to the current collector.

In one embodiment, the electrode films thus produced are then combined by lamination. In order to ensure that the components so laminated or otherwise combined are in excellent ionically conductive contact with one another, the components are combined with an electrolyte solution comprising an aprotic solvent, preferably an organic carbonate as hereinabove described, and a lithium imide or methide salt represented by the formula I.

While the invention has been described by way of example and in terms of the specific embodiments, it is to be understood that examples and embodiments described herein are for illustrative purposes only and the invention is not limited to the disclosed embodiments. It is intended to cover various modifications and similar arrangements as would be apparent to those skilled in the art. Therefore, the scope of the appended claims should be accorded the broadest interpretation so as to encompass all such modifications and similar arrangements. All publications, patents, and patent applications cited herein are hereby incorporated by reference in their entirety for all purposes.

What is claimed is:

1. An electrochemical cell, said electrochemical cell comprising:
   a positive electrode comprising a positive electrode material and a positive electrode current collector, wherein the positive electrode material is in electronically conductive contact with the positive electrode current collector, and wherein the positive electrode current collector comprises a conductive non-metal substrate;
   a negative electrode comprising a negative electrode material and a negative electrode current collector, wherein the negative electrode material is in electronically conductive contact with the negative electrode current collector;
   an electronically insulative and ion conductive medium in ionically conductive contact with said positive electrode and said negative electrode, wherein said ionic conductive medium comprises an ion conductive layer and a corrosive electrolyte solution;
   at least one positive electrode tab having a first attachment end and a second attachment end, wherein said at least one positive electrode tab is metallic; wherein said at least one positive electrode tab is not in contact with said corrosive electrolyte; and wherein the first attachment end of said at least one positive electrode tab is connected to said conductive non-metal substrate by means of at least one rivet or staking;
   at least one negative electrode tab having a first attachment end and a second attachment end, wherein said first attachment end of said at least one negative electrode tab is connected to said negative electrode current collector.

2. The cell of claim 1, wherein the positive electrode current collector is a conductive carbon sheet selected from the group consisting of a graphite sheet, a carbon fiber sheet, a carbon foam, a carbon nanotube film and a mixture thereof;
   wherein the in-plane electronic conductivity of the conductive carbon sheet is at least 1000 S/cm; and
   wherein each of the tabs is made of an electrically conductive material.

3. The cell of claim 2, wherein the electrically conductive material is a metal selected from the group consisting of copper, nickel, chromium, aluminum, titanium, stainless steel, gold, tantalum, niobium, hafnium, zirconium, vanadium, indium, cobalt, tungsten, tin, beryllium, and alloys thereof.

4. The cell of claim 1, wherein the positive electrode and the positive electrode tab form an interface; and
   wherein the resistance of the interface is less than about 25 mOhm-cm$^2$.

5. The cell of claim 1, wherein said at least one positive electrode tab is a plurality of metal tabs attached to the positive electrode current collector.

6. The cell of claim 2, wherein the positive electrode current collector, the negative electrode current collector or both are treated with a conductive resin.

7. The cell of claim 1, wherein the positive electrode material is a transition metal oxide, a transition metal phosphate, a transition metal sulfate, or a lithium insertion transition metal oxide.

8. The cell of claim 7, wherein the lithium insertion transition metal oxide has a formula selected from the group consisting of $Li_xMO_2$, $Li_{1+x}M'_{2-y}O_4$, $LiV_2O_5$, $LiV_6O_{13}$, $Li_{x''}M''XO_4$ and $Y_{x'''}M'''_2(X'O_4)_3$,
   wherein:
   M is a transition metal selected from the group consisting of Mn, Fe, Co, Ni, Ti, V and a combination thereof; and the subscript x is a real number between about 0.01 and about 1;
   M' is a transition metal selected from the group consisting of Mn, Co, Ni, Ti, V and a combination thereof; the subscript x' is between about −0.11 and 0.33; and the subscript y is a real number between about 0 and 0.33;
   M" is a transition metal selected from the group consisting of Fe, Mn, Co, Ni, and a combination thereof; X is selected from the group consisting of P, V, S, Si and a combination thereof; and the subscript x" is a real number between about 0 and 2;
   Y is Li, Na or a combination thereof; M''' is a transition metal selected from the group consisting of Fe, V, Nb, Ti, Co, Ni and a combination thereof; X' is selected from the group consisting of P, S, Si, and a combination thereof; and the subscript x''' is a real number between 0 and 3.

9. The cell of claim 7, wherein the positive electrode material is doped with a metallic cation selected from the group consisting of $Fe^{2+}$, $Ti^{2+}$, $Zn^{2+}$, $Ni^{2+}$, $Co^{2+}$, $Cu^{2+}$, $Mg^{2+}$, $Cr^{3+}$, $Fe^{3+}$, $Al^{3+}$, $Ni^{3+}$, $Co^{3+}$ and $Mn^{3+}$.

10. The cell of claim 1, wherein the positive electrode material comprises $LiCoO_2$, spinel $LiMn_2O_4$, a chromium-doped spinel lithium manganese oxide, $xLi_2MnO_3(1-x)LiMO_2$, $LiNi_yMn_{1-y}O_2$, $LiMO_2$, $LiNi_xCo_{1-x}O_2$, a lithium vanadium oxide, $LiM'PO_4$, or $LiFeTi(SO_4)_3$;
   wherein:
   M is selected from the group consisting of Ni, Co and Mn;
   M' is selected from the group consisting of Fe, Ni, Mn and V; and x and y are each independently a real number between 0 and 1.

11. The cell of claim 2, wherein the carbon sheet has a thickness from about 10 μm to about 1000 μm, wherein the carbon sheet comprises less than 5% of a conductive additive selected from the group consisting of carbon black, carbon fiber and carbon nanotubes; and wherein the carbon sheet has a purity of at least 95%.

12. The cell of claim 1, wherein the negative electrode material is selected from the group consisting of graphite microbeads, natural graphites, carbon fibers, graphite flakes, carbon nanotubes, Li metal, Si, Sn, Sb and Al.

13. The cell of claim 12, wherein the negative electrode current collector is selected from the group consisting of a metal foil and a carbon sheet, wherein the metal sheet has a thickness between about 5 μm and 300 μm; and wherein the carbon sheet is selected from the group consisting of a graphite sheet, a carbon fiber sheet, a carbon foam having a thickness between about 10 and 1000 μm, a carbon nanotube film and a mixture thereof.

14. The cell of claim 1, wherein at least one of the second attachment ends is coupled to an electrically conductive member for connecting to an external circuit.

15. The cell of claim 1, wherein the ion conductive layer is an ion conductive membrane or a microporous layer.

16. The cell of claim 1, wherein the corrosive electrolyte solution comprises a solvent selected from the group consisting of a lactone, ethylene carbonate, propylene carbonate, dimethyl carbonate, diethylmethyl carbonate and mixtures thereof;

wherein the corrosive electrolyte solution comprises a salt selected from the group consisting of $LiPF_6$, $LiBF_4$, $LiClO_4$ and a compound having the formula:

$(R^aSO_2)N^-Li^+(SO_2R^a)$ wherein each $R^a$ is independently $C_{1-8}$ perfluoroalkyl or perfluoroaryl.

17. The cell of claim 1, wherein the corrosive electrolyte solution comprises a salt selected from the group consisting of $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li)SO_2CF_2OCF_3$, $C_6F_5SO_2N^-(Li^+)SO_2CF_3$, $C_6F_5SO_2N^-(Li^+)SO_2C_6F_5$ and $CF_3SO_2N^-(Li^+)SO_2PhCF_3$.

18. The cell of claim 17, wherein the corrosive electrolyte solution comprises $CF_3SO_2N^-(Li^+)SO_2CF_3$.

19. The cell of claim 1, wherein at least one first attachment end of the tabs has a smooth surface.

20. The cell of claim 1, wherein at least one first attachment end of the positive electrode tabs, the negative electrode tabs or both electrode tabs comprises an array of preformed micro indentations;

wherein each indentation is about 1-100 μm in depth and about 1-500 μm in dimension; and wherein said array of indentations is evenly spaced.

21. The cell of claim 1, wherein the first attachment end of each tab has a shape independently selected from the group comprising a circle, an oval, a triangle, a square, a diamond, a rectangle, a trapezoidal, a U-shape, a V-shape, an L-shape and an irregular shape; and wherein the first attachment end of each tab has a dimension of at least 500 μm in width and 5 mm in length.

22. The cell of claim 1, wherein at least one first attachment end of the positive electrode tabs, the negative electrode tabs or both electrode tabs is in direct contact with the positive electrode current collector.

23. The cell of claim 1, wherein at least one first attachment end of the positive electrode tabs, the negative electrode tabs or both electrode tabs is in contact with the positive electrode current collector through a conductive layer.

24. The cell of claim 23, wherein the conductive layer is in contact with the surface of said at least one positive electrode tab, negative electrode tab or both electrode tabs; and wherein the conductive layer has a thickness of about 1 nm to about 100 μm.

25. The cell of claim 23, wherein the conductive layer comprises a conductive filler and a binder;

wherein the conductive filler is selected from the group consisting of carbon black, conducting polymers, carbon nanotubes and carbon composite materials; and wherein the binder is selected from the group consisting of a polymer, a copolymer and a combination thereof.

26. The cell of claim 1, wherein each of the first attachment ends comprises an array of preformed micro openings having a plurality of protruding edges;

wherein each said array of openings has a dimension of about 1-1000 μm;

wherein said array of openings is evenly spaced; and wherein said array of openings has a shape selected from the group consisting of an circle, an oval, a triangle, a square, a diamond, a rectangle, a trapezoidal, a rhombus, a polygon and an irregular shape.

27. The cell of claim 1, wherein the positive electrode tab, the negative electrode tabs or both electrode tabs are in contact with a protective coating;

wherein the protective coating is selected from the group consisting of an anodizing coating, an oxide coating, conductive carbon, an epoxy coating, a glue coating, a paint coating, and a layer of metal; and wherein the layer of metal is selected from the group consisting of copper, nickel, chromium, aluminum, titanium, stainless steel, gold, tantalum, niobium, hafnium, zirconium, vanadium, indium, cobalt, tungsten, tin, beryllium and chromium.

28. The cell of claim 1, wherein the positive electrode tab, the negative electrode tabs or both electrode tabs are in contact with a layer of metal selected from the group consisting of nickel, silver, gold, palladium, platinum and rhodium.

29. A battery comprising:

a housing;

a positive connector;

a negative connector, wherein said positive connector and said negative connector are mounted on said housing; and a electrochemical cell of claim 1 disposed in said housing.

* * * * *